United States Patent [19]

Ravitts

[11] 4,056,477
[45] Nov. 1, 1977

[54] SEPARATING APPARATUS FOR CLARIFYING LIQUID

[75] Inventor: Richard B. Ravitts, Rockford, Ill.

[73] Assignee: Riga, Inc., Rockford, Ill.

[21] Appl. No.: 697,929

[22] Filed: June 21, 1976

[51] Int. Cl.² .......................................... B01D 43/00
[52] U.S. Cl. ................................. 210/522; 210/237; 210/519
[58] Field of Search ............... 210/237, 519, 521, 522, 210/84

[56] References Cited

U.S. PATENT DOCUMENTS

| | | | |
|---|---|---|---|
| 828,515 | 8/1906 | Schmidt | 210/519 |
| 1,946,414 | 2/1934 | Schmid | 210/521 |
| 2,673,451 | 3/1954 | Gariel | 210/521 |
| 3,353,676 | 11/1967 | Hirsch | 210/519 |
| 3,419,145 | 12/1968 | Decelis | 210/519 |
| 3,563,389 | 2/1971 | Mizrahi | 210/521 |
| 3,837,501 | 9/1974 | Pielkenrood | 210/522 |
| 3,894,955 | 7/1975 | Forsell | 210/522 |
| 3,898,164 | 8/1975 | Hsiung | 210/521 |
| 3,951,818 | 4/1976 | Bosnjak | 210/522 |

FOREIGN PATENT DOCUMENTS 1,428,403  3/1976  United Kingdom ................. 210/522

Primary Examiner—Frank W. Lutter
Assistant Examiner—David L. Lacey
Attorney, Agent, or Firm—Leydig, Voit, Osann, Mayer & Holt, Ltd.

[57] ABSTRACT

The separating apparatus includes a cartridge-type separator disposed in a tank and having a series of vertically extending and horizontally spaced baffles which cause still channels to exist downstream of the baffles. Rows of vertically spaced vanes are located in the spaces between the baffles with the vanes in alternate rows being inclined downwardly in opposite directions. Water flowing to the separator is deflected to the vanes by the baffles and, as the water flows between the vanes, flotable and settleable substances in the water contact the vanes and are directed into the still channels so as to either float or sink from the separator. Every other still channel serves exclusively as an escape duct for flotable substances while the intervening still channels serve exclusively as escape ducts for settleable substances.

5 Claims, 8 Drawing Figures

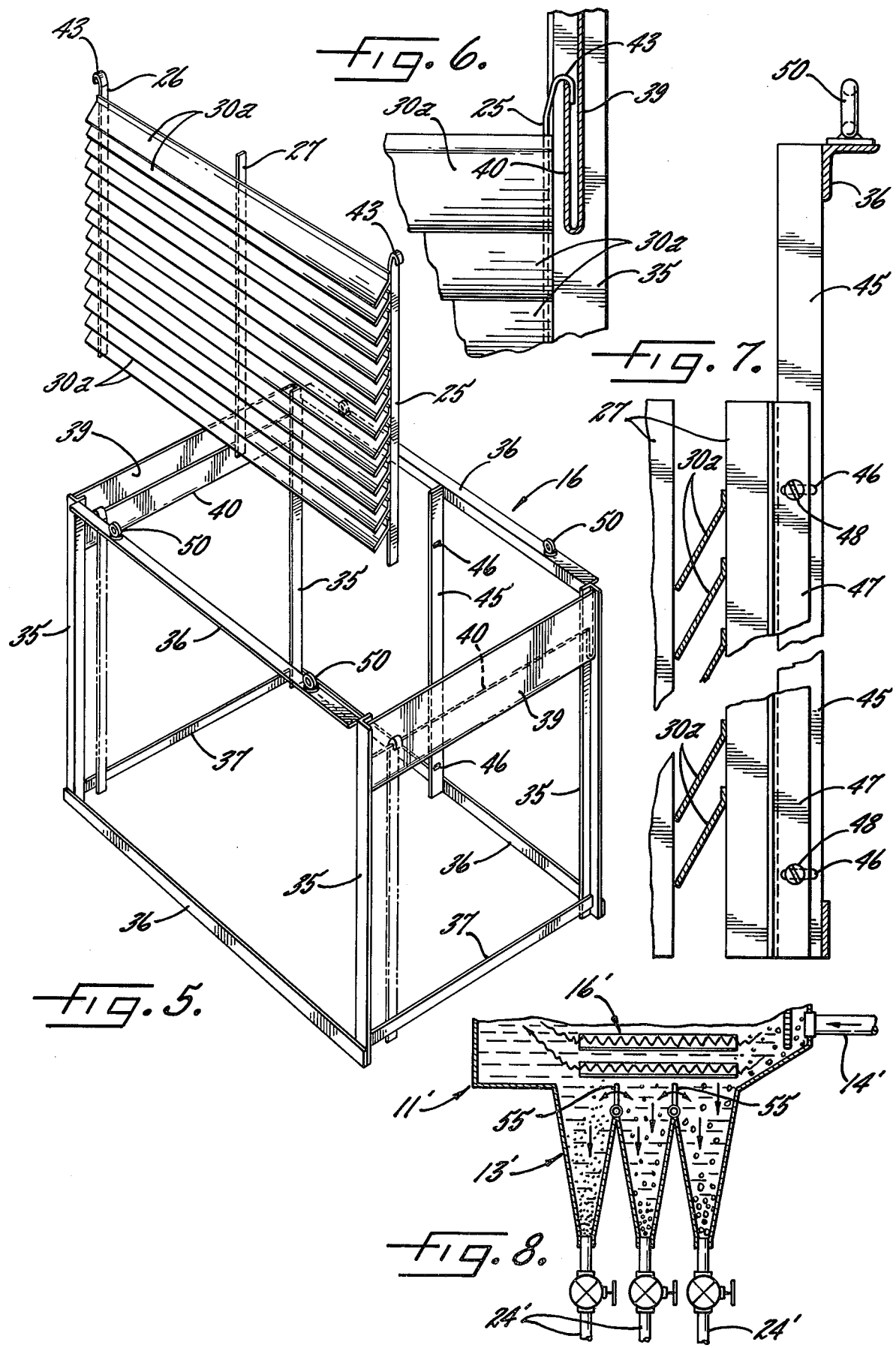

SEPARATING APPARATUS FOR CLARIFYING LIQUID

BACKGROUND OF THE INVENTION

This invention relates in general to apparatus for separating suspended settleable and flotable substances from a flow of liquid in order to clarify the liquid. More particularly, the invention pertains to apparatus of the type in which the liquid is directed through passages defined by several spaced rows of spaced plates or vanes. The suspended substances in the liquid contact the vanes and are directed out of the flow and into upright ducts or channels located between the rows of vanes and existing as a result of upright baffles which are positioned adjacent the upstream ends of the vanes. Apparatus of this general type is disclosed in Pielkenrood U.S. Pat. No. 3,837,501.

SUMMARY OF THE INVENTION

The general aim of the present invention is to provide improved and more economical apparatus of the foregoing type which achieves effective separation of both flotable and settleable substances from a flow of liquid while requiring less material and less fabrication time than prior apparatus and while lending itself to faster and easier cleaning.

A more detailed object of the invention is to achieve the foregoing by providing separating apparatus in which the sets of vanes are uniquely arranged such that the channels between adjacent sets of vanes are open across their full width, every other channel serving exclusively as an escape duct for flotable substances and each intervening channel serving exclusively as an escape duct for settleable substances.

Another object is to incline the vanes of two adjacent rows in opposite directions so that all flotable substances contacting the vanes of both rows are directed into a common channel between the rows while all settleable substances contacting the vanes of the two rows are directed into two separate channels which also receive the settleable substance from still other rows of vanes.

The invention also resides in the unique formation of the various vanes and baffles as a unitary cartridge and in the novel construction enabling independent removal of each set of vanes and baffles from the cartridge.

These and other objects and advantages of the invention will become more apparent from the following detailed description when taken in conjunction with the accompanying drawings.

BRIEF DESCRIPTION OF THE DRAWINGS

FIG. 5 is an exploded perspective view showing parts of the cartridge.

FIGS. 6 and 7 are enlarged fragmentary cross-sections taken substantially along the lines 6—6 and 7—7, respectively, of FIG. 2.

FIG. 8 is a fragmentary view similar to FIG. 1 but shows a modified tank.

DETAILED DESCRIPTION OF THE PREFERRED EMBODIMENTS

Figures 1, 2:
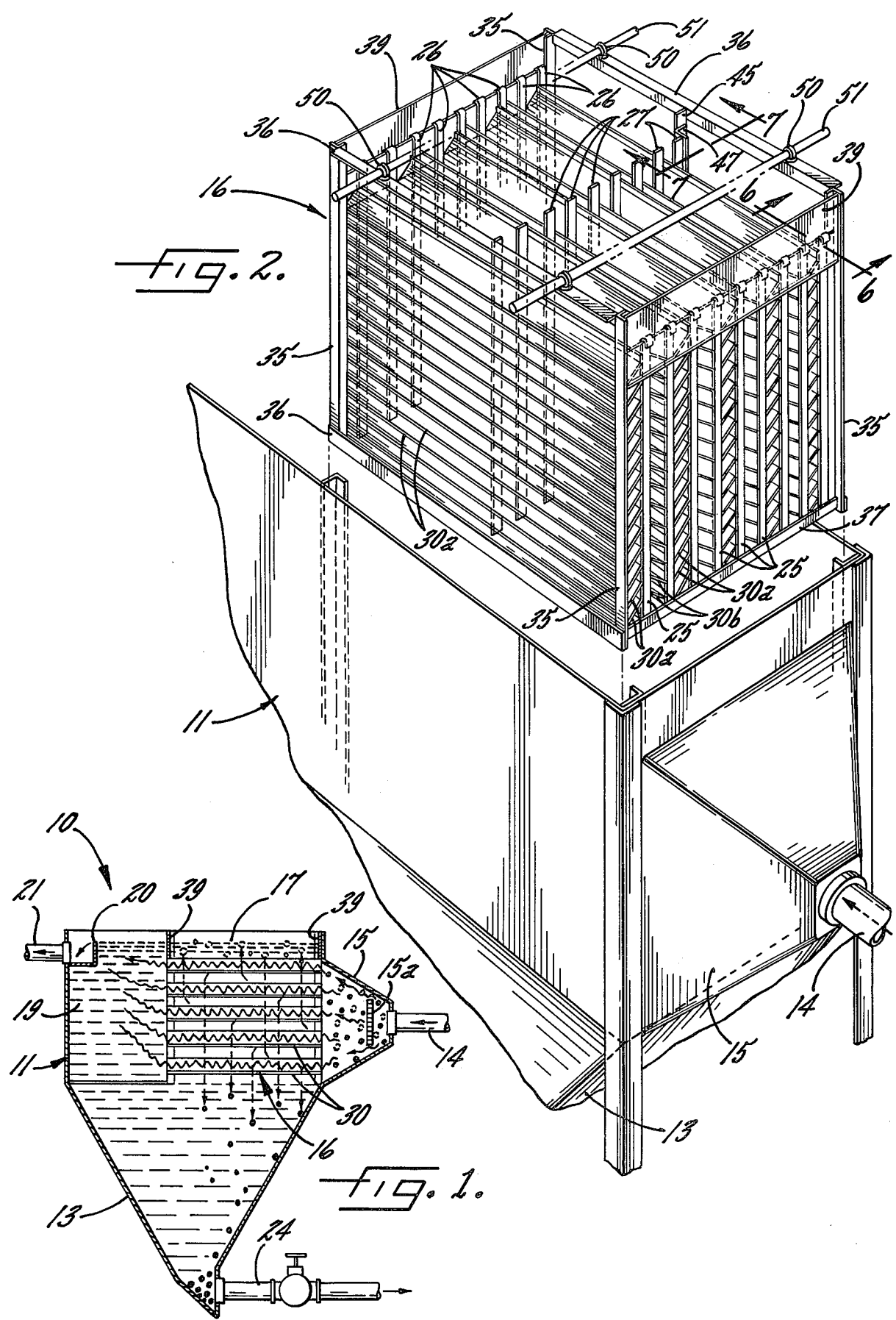
FIG. 1 is a side elevation of an exemplary clarifying vessel equipped with a new and improved separating cartridge incorporating the unique features of the present invention.
FIG. 2 is a fragmentary perspective view showing the cartridge exploded upwardly from the vessel.

As shown in the drawings for purposes of illustration, the invention is embodied in apparatus 10 for clarifying a flow of water or other liquid by separating suspended flotable and settleable substances from the water. Herein, the apparatus includes a vessel or tank 11 (FIG. 1) having a generally rectangular top section and a generally pyramidal bottom section or funnel 13. Water flows into the tank through an inlet defined by a horizontal inlet pipe 14 and by a pyramidal distributing chamber 15 whose small end is connected to the pipe and whose large end opens into the tank. An upright circular plate 15a with several apertures is located within the chamber 15 in alinement with the pipe 14 and diffuses the incoming stream of water before the latter flows to a separator 16 disposed in the upstream end portion of the upper section of the tank.

The diffused water flows generally horizontally through the separator 16 and, during such flow, settleable solids sink into the funnel 13 while flotable solids and liquids (e.g., oil) rise upwardly into a flotation zone 17 (FIG. 1) above the separator. The clarified water then passes into a stilling zone 19 in the downstream end portion of the upper section of the tank 11, flows over a level control weir 20, and finally discharges from the tank through an outlet pipe 21. Settleable solids may be removed from the funnel 13 through a valved drain line 24 while the flotable substances may be skimmed from the flotation zone 17. As used herein, the terms settleable and flotable substances refer to substances which will sink and rise, respectively, within a carrier liquid if that liquid is held still or is maintained in a laminar stream.

The present invention contemplates the provision of a new and improved separator 16 which divides the incoming water into several substantially laminar streams each bounded on two sides by upright channels of still water, each channel defining an escape duct for the suspended substances in the streams on opposite sides of the channel with some channels serving exclusively as escape ducts for flotable substance and with alternate channels serving exclusively as escape ducts for setteable substances. By virtue of this arrangement, the still channels need not be longitudinally partitioned neighboring streams but instead each channel may be open across its full width in order to save material, reduce fabrication costs and facilitate cleaning of the separator.

Figure 3:
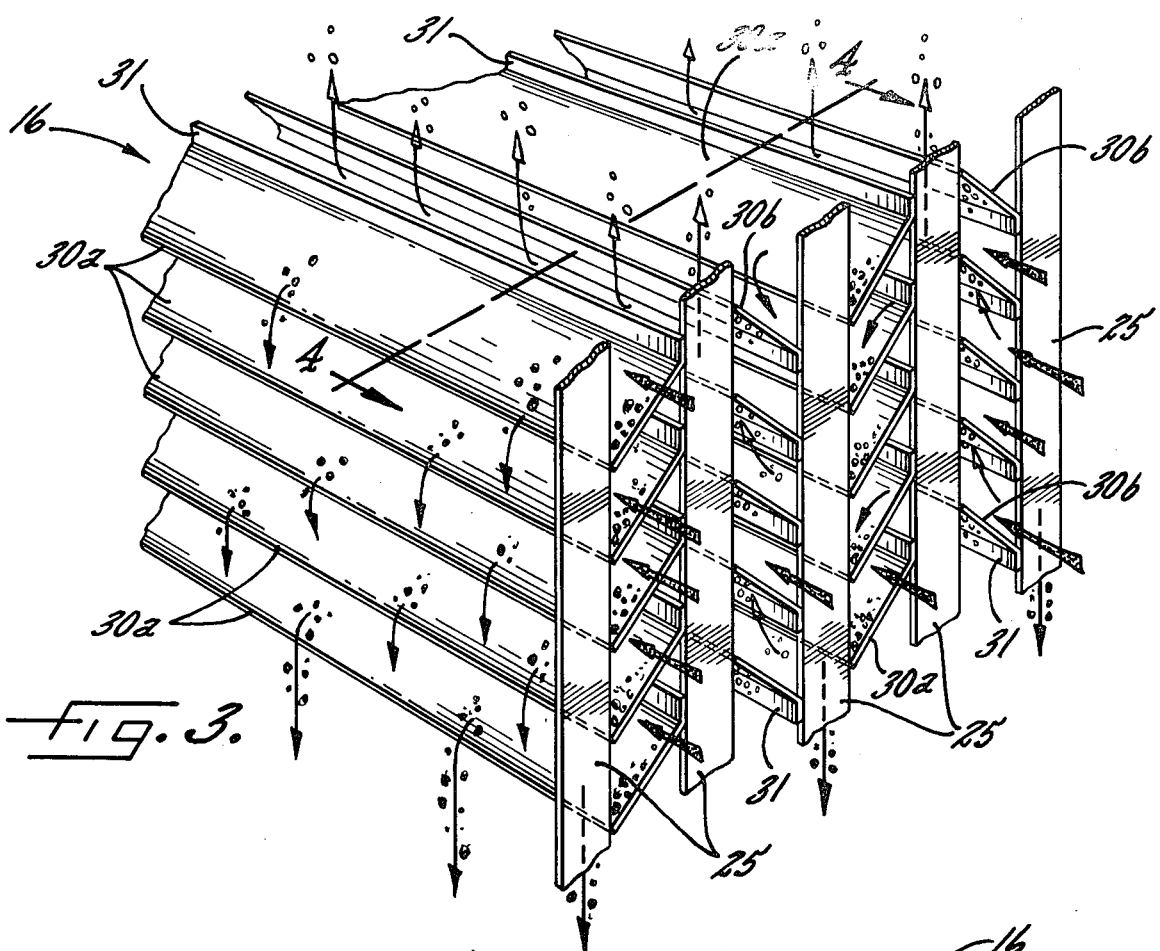
FIG. 3 is a fragmentary perspective view showing some of the vanes and baffles.
Figure 4:
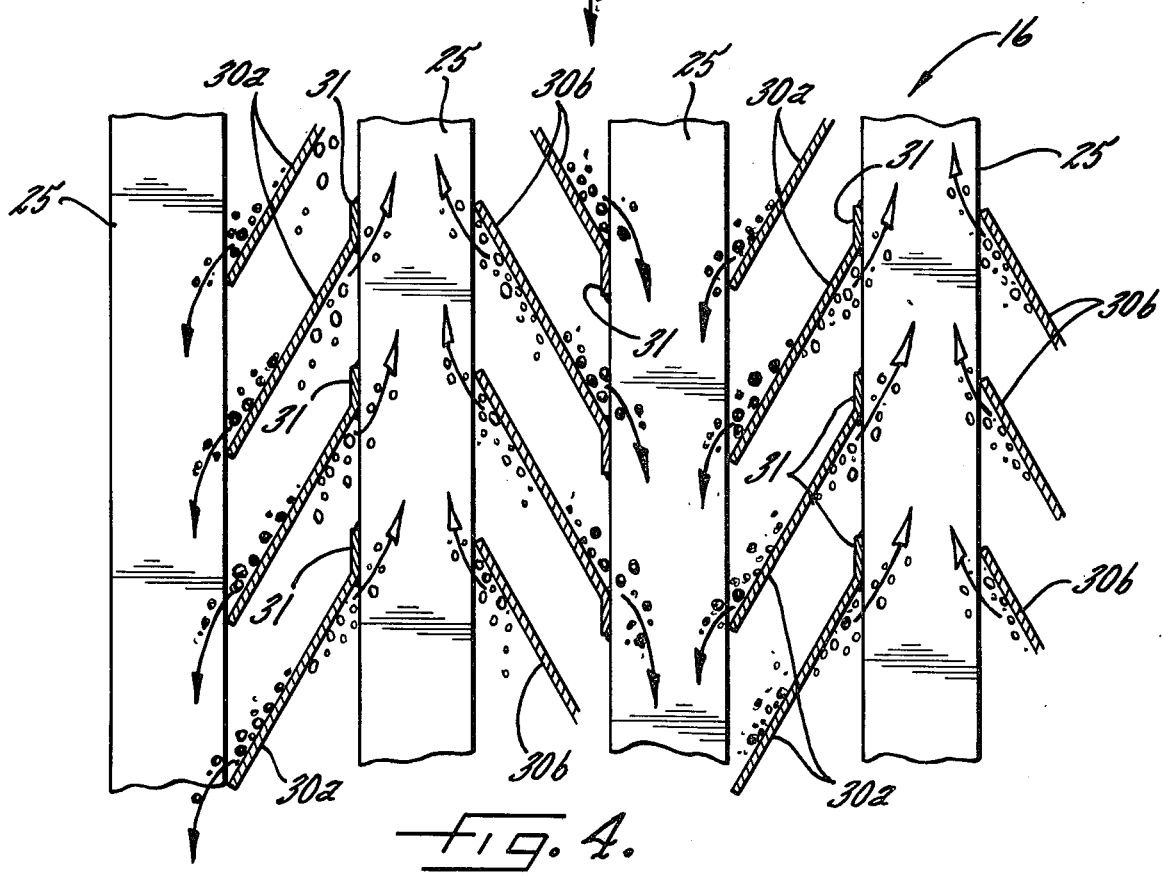
FIG. 4 is an enlarged fragmentary cross-section taken substantially along the line 4—4 of FIG. 3.

More specifically, the still channels are created as a result of providing a series of upright and preferably vertical baffles 25 (FIGS. 3 and 4) which are spaced horizontally from one another across the path of the water flowing past the diffuser plate 15a. The baffles 25 define the extreme upstream end of the separator 16 and serve to laterally deflect the incoming water into the spaces between the baffles. Once the tank 11 has been filled, the water flowing through such spaces consists of substantially laminar and horizontal streams which remain non-turbulent as long as the velocity of the water is kept below 6 ft./min. As a result of the laminar flow in the spaces between the baffles, the water in the spaces or channels which are alined directly with and located downstream of the baffles remains substantially still and free of downstream flow. The still channels correspond substantially in width and height to the width and height of the baffles 25 and correspond in length to the length of the separator 16.

In the preferred embodiment, a second set of baffles 26 (FIGS. 2 and 5) in alined with the first set 25 at the downstream end of the separator 16 while a third set of baffles 27 is located midway between the first and second sets. The third set of baffles 27 divides the still channels into front and rear zones and tends to isolate the rear zones from any turbulence in the front zones in the rare event that such turbulence might occur.

The water flowing within the spaces between the baffles 25 is divided into several streams by horizontally spaced rows of vertically spaced vanes 30, there being one row of vanes located within the space between each two baffles. Each vane preferably is flat or planar and is inclined such that its upper surface diverges downwardly away from the horizontal at an angle of at least 60°. At one end, each vane is formed with a vertical flange 31 (FIG. 4) which is welded to the edge of the adjacent baffle 25 and also to the edges of the two alined baffles 26 and 27. Each vane extends from the edges of the baffles to which it is attached to the adjacent edges of the neighboring baffles and is positioned such that its free longitudinal edge extends along a horizontal line. The vanes of each row are mutually parallel and each vane is of uniform width throughout its length.

In carrying out the invention, the vanes 30a of every other row are inclined in one direction while the vanes 30b of every intervening row are inclined in the opposite direction. Thus, it will be seen that the vanes 30a of the left row shown in FIGS. 3 and 4 slope upwardly upon progressing away from the far left baffle 25, the vanes 30b of the next row slope downwardly upon progressing away from the next baffle 25, the vanes 30a of the third row slope upwardly upon progressing away from the third baffle and so on. Stated differently, the vanes 30a and 30b in two given adjacent rows all slope downwardly upon progressing away from the intervening baffle 23 (e.g., the second baffle from the left in FIG. 4) while the vanes in one of such rows and the vanes in the next adjacent row all slope upwardly upon progressing away from the next baffle (e.g., the third baffle from the left in FIG. 4).

By virtue of the vanes 30a and 30b, the water flowing horizontally into the spaces between the baffles 25 is divided into several discrete streams. Since the flow is laminar, the water in the streams neither affects nor is affected by the water in the still channels which are alined with the baffles. The flotable and settleable substances react in the laminar streams just as they would in still water and thus the flotable substances start rising in the laminar streams and the settleable substances begin to sink. As the flotable substances rise, they contact the undersides of the overlying vanes and are deflected laterally and upwardly into the still channels adjacent the tops of the vanes. By the same token, the sinking settleable substances contact the upper sides of the underlying means and are deflected laterally and downwardly into the still channels adjacent the bottoms of the vanes (see FIGS. 3 and 4). Floating and settling of the substances in the laminar streams take place at free and non-hindered settling and rise rates because of unrestricted discharge of the substances into the still channels. Once the substances reach the still channels, they may be considered to be separated from the streams and they will float upwardly through the channels to the flotation zone 17 or sink downwardly through the channels to the funnel 13 as the case may be. These processes are considered to take place at free settling and rise rates since sinking and rising of the substances is not hindered by compaction of the substances in the still channels. Compaction occurs below in the funnel 13 or above in the flotation zone 17.

Because the vanes 30a and 30b of alternate rows are inclined in opposite directions, the still channels alined with every other baffle 25 serve exclusively as escape ducts for flotable substances while the still channels alined with the intervening baffles serve exclusively as escape ducts for settleable substances. Taking, for example, the still channel alined with the second baffle 25 from the left in FIG. 4, it will be seen that this channel receives the flotable substances from the vanes 30a on its left and also from the vanes 30b on its right. It does not receive any settleable substances since the settleable substances from the vanes 30a on its left go to the still channel on its left while the settleable substances from the vanes 30b on its right go to the still channel on its right. The latter still channel also receives the settleable substances from the vanes 30a on its right and does not receive any flotable substances. Accordingly, each still channel receives only the settleable substances from two adjacent rows of vanes or only the flotable substances from two adjacent rows of vanes and no still channel is subjected to a counterflow of settleable and flotable substances. Also, no still channel or laminar stream is subjected to a counterflow of liquid to liquid or liquid to solids. Moreover, there is no counterflow of settleable substance to flotable substances as the substance are discharged out of the laminar streams across the vanes. This complete avoidance of counterflow is achieved without the need of dividing each still channel with a partition and thus the cost of providing and installing such partitions is eliminated along with the need for cleaning such partitions when accumulated substances are cleaned from the separator 16.

Another significant advantage of the invention resides in constructing the separator 16 as a unitary cartridge to facilitate removal of the separator from the tank 11 for cleaning. Also, each row of vanes 30 and the three connected baffles 25, 26 and 27 may be removed easily from the cartridge independently of the other vanes and baffles for cleaning or replacement.

As shown most clearly in FIGS. 2 and 5, the baffles 25, 26 and 27 and the vanes 30 are contained within a box-like framework which serves to interconnect the end baffles 25 and 26. This framework comprises four upright corner members 35 suitably welded to and interconnected by four longitudinally extending members 36 and two lower transversely extending members 37. Extending transversely between and welded to the upper ends of the corner members 35 are front and rear plates 39 each formed with an inwardly and upwardly turned curl 40 (FIG. 6) on its lower end. The plates 39 define the upstream and downstream ends of the flotation zone 17 and shield the uppermost vane 30 of each row.

In order to support the baffles 25, 26 and 27 and the vanes 30 within the framework, the upper end of the end baffles 25 and 26 is bent outwardly and downwardly to form a hook 43 (FIG. 6). The hooks are adapted to be hung on the curls 40 of the plates 39 thereby to suspend each row of vanes and the three connected baffles from the plates while permitting that baffle and vane subassembly to be lifted out of the framework independently of the other baffles and vanes (see FIG. 5). The several subassemblies are disposed in side-by-side relation in the framework with the free edges of the vanes of one subassembly located in engagement with the side edges of the baffles of the next subassembly. The free edges of the vanes of the far left subassembly (FIG. 5) engage the adjacent upright corner members 35.

To hold the baffle and vane subassemblies in side-by-side engagement, an upright angle bar 45 (FIGS. 5 and 7) spans the longitudinal members 36 on the right side (FIG. 7) of the framework and is formed with a pair of vertically spaced and laterally elongated holes 46. Correspondingly spaced holes are formed in another angle bar 47 and receive bolts 48 which also extend through the holes 46. By loosening the bolts 48, the bar 47 may be shifted laterally into pressing engagement with the middle baffle 27 of the far right subassembly to the extent necessary to pack all of the subassemblies snugly within the framework.

It should be noted that all of the baffle and vane subassemblies may be constructed by virtually identical fabrication techniques even though the vanes 30a and 30b of alternate assemblies are inclined in opposite directions. That is, the vanes of all subassemblies may be welded to the baffles 25, 26 and 27 while the vanes are inclined in the same direction and while the parts are held in a common jig. When assembling the cartridge, one subassembly is simply inverted relative to its neighboring subassembly to cause the vanes of adjacent rows to slope in opposite directions. The hooks 43 are bent from whichever ends of the baffles 25 and 26 are disposed uppermost when a given subassembly is in its installed orientation in the cartridge. Accordingly, the present arrangement enables the vanes 30 of each subassembly to be welded to the baffles 25, 26 and 27 without need of taking into account the direction of inclination of the vanes.

To facilitate removal of the separator 16 from the tank 11, two longitudinally spaced pairs of laterally spaced eyes 50 (FIGS. 2 and 7) are secured to the upper sides of the upper longitudinal frame members 36. A bar 51 is telescoped through the eyes of each pair and is located with its end portions in overhanging engagement with the top edges of the tank 11. The bars suspend the separator 16 within the tank and provide a means by which the separator may be lifted up from the tank for cleaning. De-watering of the tank is not necessary in order to remove the separator nor is it necessary to release any fasteners. The separator may be easily washed with a hose and brush and then lowered back into the tank.

It should be further noted that the heavier settleable substances and the more buoyant flotable substances will sink and rise, respectively, at a faster rate in the laminar streams than their lighter and less buoyant counterparts. Thus, the heavier and more buoyant substances emerge from the separator 16 in the upstream portion thereof while progressively lighter and less buoyant substances emerge progressively as they proceed downstream. This enables the substances to be classified for recycling.

To facilitate classification of the settleable solids, a tank 11' (FIG. 8) with a modified funnel 13' may be employed. The modified funnel includes three generally pyramidal compartments each having its own valved drain line 24'. Heavy solids settle into the upstream or far right compartment, medium solids sink into the middle compartment, and lighter solids or fines settle into the downstream or far left compartment. To effect additional control over the grade of solids which settle into each of the compartments, transversely extending baffles 55 are mounted on opposite sides of the middle compartment at the upper end thereof and may be selectively pivoted about horizontal axes. If, for example, it is found that certain solids falling into the middle compartment should be classified as fines, the left baffle 55 may be adjusted clockwise so as to cause the baffle to deflect those solids into the left compartment.

From the foregoing, it will be apparent that the present invention brings to the art new and improved separating apparatus 10 having a separator 16 which is comparatively simple and inexpensive and which relies on the laws of gravity and laminar flow to achieve effective separation of the flotable and settleable substances. Because the substances separate from the water flowing through the separator much in the same manner as they would in a still body of water, the rise and/or settling rate of the solids in a given specimen of waste water may be determined by a jar test and may be used to accurately determine the size of separator required for a given volume of flow. Coarse separators for water having large diameter solids may be provided by increasing the width of the still channels and the width and vertical spacing of the vanes 30 and fine separators may be provided by decreasing the width of the channels and the width and vertical spacing of the vanes.

I claim:

1. Apparatus for separating suspended settleable and flotable substance from liquid, said apparatus comprising a vessel having an upstream inlet for receiving a substantially horizontal flow of said liquid and having a downstream outlet for discharging said liquid, a separator located in said vessel between said inlet and outlet, said separator having an upstream portion defined by a series of at least first, second and third substantially vertical upstream baffles spaced substantially horizontally from one another across the path of the incoming liquid, said separator having a downstream portion defined by a series of at least first, second and third substantially vertical downstream baffles spaced substantially horizontally from one another and alined with said first, second and third upstream baffles, respectively, the space alined with and located between said first baffles defining a first channel, the space alined with and located between said second baffles defining a second channel, and the space alined with and located between said third baffles defining a third channel, each of said channels having the same width as its respective baffles and being open across its entire width and along its entire height, said upstream baffles deflecting the incoming flow of liquid into the space between said first and second upstream baffles and into the space between said second and third upstream baffles and preventing any substantial downstream flow into said channels whereby the liquid in said channels is substantially still, said separator further including a first row of vertically spaced and parallel vanes having upstream end portions extending between said first and second upstream baffles and secured to one of the latter baffles, the vanes of said first row having downstream end portions extending between said first and second downstream baffles and secured to one of the latter baffles, said separator further including a second row of vertically spaced and parallel vanes having upstream end portions extending between said second and third upstream baffles and secured to one of the latter baffles, the vanes of said second row having downstream end portions extending between said second and third downstream baffles and secured to one of the latter baffles, the vanes of each of said rows sloping downwardly upon progressing away from said second baffles whereby suspended flotable substance in the liquid flowing horizontally downstream within the spaces between said vanes rise into contact with the undersides of said vanes and are directed upwardly and laterally into said second still channel while the suspended settleable substance in such liquid sink into contact with the upper sides of said vanes and are directed downwardly and laterally by the vanes of said first row into said first still channel and by the vanes of said second row into said third still channel, the vanes of said first row all having lower edges disposed in a common vertical plane coinciding with one side of said first still channel and all having upper edges disposed in a common vertical plane coinciding with the adjacent side of said second still channel, and the vanes of said second row all having upper edges disposed in a common vertical plane coinciding with the other side of said second still channel and all having lower edges disposed in a common vertical plane coinciding with one side of said third still channel.

2. Apparatus as defined in claim 1 further including means for connecting all of said baffles to one another whereby said vanes and baffles form a cartridge adapted for removal as a unit from said vessel.

3. Apparatus as defined in claim 2 in which the vanes of said first row are connected to said second baffles and the vanes of said second row are connected to said third baffles, said baffles being detachably connected to said connecting means whereby each pair of baffles and its connected row of vanes may be removed from said cartridge independently of the other baffles and vanes.

4. Apparatus as defined in claim 1 in which the vanes of said first row are secured at their side edges only to said second baffles and slope downwardly upon progressing away from said second baffles, the vanes of said second row being secured at their side edges only to said third baffles and sloping upwardly upon progressing away from said third baffles.

5. Apparatus for separating suspended settleable and flotable substance from liquid, said apparatus comprising a vessel having an upstream inlet for receiving a flow of said liquid and having a downstream outlet for discharging said liuqid, a separator located in said vessel between said inlet and outlet, said separator having an upstream end portion defined by a series of at least three upright baffles spaced from one another across the path of the incoming liquid, said series of baffles comprising a center baffle and comprising first and second outer baffles located on opposite sides of said center baffle, said separator further comprising first and second rows of vertically spaced and parallel vanes extending in a downstream direction from said baffles, the vanes of said first row having upstream end portions extending transversely between said center baffle and said first outer baffle, the vanes of said second row having upstream end portions extending tranversely between said center baffle and said second outer baffle, the vanes of each of said rows sloping downwardly upon progressing away from said center baffle, the vanes of said first row all having lower edges disposed in the same plane as the edge of said first outer baffle located closest to said center baffle and all having upper edges disposed in the same plane as that edge of said center baffle that is nearest to said first outer baffle, the vanes of said first row being connected to either said center or said first outer baffle, the vanes of said second row all having lower edges disposed in the same plane as the edge of said second outer baffle located closest to said center baffle and all having upper edges disposed in the same plane as that edge of said center baffle that is nearest to said second outer baffle, the vanes of said second row being connected to either said center baffle or said second outer baffle.

* * * * *